United States Patent
Allen et al.

(10) Patent No.: US 10,833,782 B1
(45) Date of Patent: *Nov. 10, 2020

(54) FACILITATING DESIRED PLACEMENT OF A SMALL CELL

(71) Applicant: Sprint Communications Company L.P., Overland Park, KS (US)

(72) Inventors: Kyle C. Allen, Overland Park, KS (US); Jay Dean Bluhm, Lenexa, KS (US); Bernard Robert Kingsley, Ashburn, VA (US); Lance Paul Lukens, Templeton, CA (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/706,223

(22) Filed: Dec. 6, 2019

Related U.S. Application Data (63) Continuation of application No. 16/005,290, filed on Jun. 11, 2018, now Pat. No. 10,506,451, which is a continuation of application No. 15/358,468, filed on Nov. 22, 2016, now Pat. No. 10,009,776.

(51) Int. Cl.
*H04B 17/318* (2015.01)
*H04W 24/02* (2009.01)
*G08B 7/06* (2006.01)
*H04W 16/26* (2009.01)
*H04W 16/32* (2009.01)

(52) U.S. Cl.
CPC ............ *H04B 17/318* (2015.01); *G08B 7/06* (2013.01); *H04W 16/26* (2013.01); *H04W 16/32* (2013.01); *H04W 24/02* (2013.01)

(58) Field of Classification Search
CPC .................................................... H04B 17/318
USPC .................................................. 455/446, 449
See application file for complete search history.

(56) References Cited

U.S. PATENT DOCUMENTS

| | | |
|---|---|---|
| 5,894,407 A | 4/1999 | Aakalu et al. |
| 8,954,083 B1 | 2/2015 | Yenney et al. |
| 9,924,433 B2 | 3/2018 | Kim et al. |
| 10,009,776 B1 | 6/2018 | Allen et al. |
| 10,051,594 B1 | 8/2018 | Ramamurthy |
| 10,506,451 B1 | 12/2019 | Allen et al. |
| 2004/0125965 A1 | 7/2004 | Alberth, Jr. et al. |
| 2009/0003637 A1 | 1/2009 | Pansell et al. |
| 2012/0242495 A1 | 9/2012 | Aguirre et al. |
| 2015/0078162 A1 | 3/2015 | Prakash et al. |
| 2015/0289181 A1 | 10/2015 | Bromell et al. |
| 2015/0312771 A1 | 10/2015 | Li |
| 2015/0327082 A1 | 11/2015 | Kadel et al. |
| 2015/0334612 A1 | 11/2015 | Ray Chaudhuri et al. |
| 2016/0081135 A1 | 3/2016 | Kang et al. |
| 2016/0157106 A1 | 6/2016 | Randall et al. |

(Continued)

OTHER PUBLICATIONS

Preinterview First Office Action dated Feb. 7, 2020, in U.S. Appl. No. 16/503,109, 4 pages.

*Primary Examiner* — Joel Ajayi (57) ABSTRACT

Methods and systems for facilitating placement of a small cell in a network are provided. A small cell may be positioned such that it is communicatively coupled to a macro cell to provide a relay backhaul to a wireless network. The small cell may be configured to provide feedback of some form when the small cell is moved from a suitable location, to facilitate desired placement and use of the small cell. The feedback may be in the form of a change in functionality of the one or more feedback components.

13 Claims, 7 Drawing Sheets

(56) References Cited

U.S. PATENT DOCUMENTS

2017/0048775 A1 2/2017 Kim
2017/0181006 A1 6/2017 Vardarajan et al.

FACILITATING DESIRED PLACEMENT OF A SMALL CELL

CROSS-REFERENCE TO RELATED APPLICATIONS

This application is a continuation of U.S. patent application Ser. No. 16/005,290, filed on Jun. 11, 2018, entitled "FACILITATING DESIRED PLACEMENT OF A SMALL CELL," which is a continuation of U.S. patent application Ser. No. 15/358,468, filed on Nov. 22, 2016, entitled "FACILITATING DESIRED PLACEMENT OF A SMALL CELL," now U.S. Pat. No. 10,009,776. The aforementioned applications are assigned or under obligation of assignment to the same entity as this application, and are incorporated in its entirety in this application by reference.

SUMMARY

A high-level overview of various aspects of the present technology is provided in this section to introduce a selection of concepts that are further described below in the detailed description section of this disclosure. This summary is not intended to identify key or essential features of the claimed subject matter, nor is it intended to be used as an aid in isolation to determine the scope of the claimed subject matter.

In brief, and at a high level, this disclosure describes, among other things, methods and systems for facilitating a desired placement of a small cell in a network to provide improved network performance, and also, methods and systems for improving functionality of a small cell within a network through directional testing, listening, and control of various sectors of coverage of the small cell. For example, a small cell may be located in or around a structure (e.g., near a window of a building), where a backhaul relay to a macro cell separate from the small cell may be established to improve network communication with mobile devices in proximity to the small cell (e.g., operating inside the structure). Feedback from a device to which the small cell is communicatively and/or physically coupled may be used to indicate when the small cell is not in a selected location or within a desired distance of a selected location that is chosen based on one or more network characteristics and/or a desired performance of the small cell. Furthermore, the small cell may be configured to utilize directional listening to determine how the small cell should operate in the network. For example, the small cell may use directional listening to determine which way a macro cell is located for establishing a backhaul relay, or may use directional listening to establish desired sector/antenna usage of the small cell based on a number of mobile devices present in different areas of coverage. As a result, a more customized, effective, and adaptable operation of a small cell may be possible, among other benefits.

In one exemplary embodiment of the present technology, an apparatus for facilitating a desired placement of a small cell is provided. The apparatus comprises a first device comprising a small cell, the small cell configured to provide at least two sectors of coverage, the small cell having one or more antennas associated with each one of the at least two sectors of coverage, the one or more antennas configured to transmit and receive radio frequency (RF) signals over a network. The apparatus further comprises a second device communicatively coupled to the first device, the second device configured to provide feedback when it is determined, by the first device, that the first device is not in a selected location.

In another exemplary embodiment of the present technology, one or more computer-readable media having computer-executable instructions embodied thereon are provided that, when executed, perform a method for a facilitating desired placement of a small cell. The method comprises receiving an indication from a small cell that the small cell is not positioned at a selected location, the small cell configured to provide at least two sectors of coverage, the small cell having one or more antennas associated with each one of the at least two sectors of coverage, the one or more antennas configured to transmit and receive radio frequency (RF) signals over a network. The method further comprises instructing a device in communication with the small cell to provide feedback that the small cell is not positioned at the selected location.

In another exemplary embodiment of the present technology, a system for facilitating a desired placement of a small cell is provided. The system comprises a small cell, the small cell configured to provide at least two sectors of coverage, the small cell having one or more antennas associated with each one of the at least two sectors of coverage, the one or more antennas configured to transmit and receive radio frequency (RF) signals over a network, the small cell having one or more sensors associated with each one of the two or more sectors. The system further comprises a processor and one or more computer-readable media storing computer-useable instructions thereon that, when executed by the processor, allow the processor to determine, based on feedback from the one or more sensors of at least one of the two or more sectors, that the small cell is not positioned at a selected location, and instruct a device that is in communication with the small cell to provide feedback that the small cell is not positioned at the selected location.

In another exemplary embodiment of the present technology, a method for improving functionality of a small cell is provided. The method comprises, at a first point in time, determining that the small cell, which provides two or more sectors of coverage, is able to attach to a macro cell based on one or more factors that include at least one of a throughput, a signal level, a reference-signal-received-power (RSRP), a signal-to-noise ratio (SNR), and a signal-to-interference-plus-noise ratio (SINR). The method further comprises listening, at the small cell, directionally using the two or more sectors for one or more mobile devices, and based on the listening, selecting at least one of the two or more sectors to operate in a first time period, wherein a first of the two or more sectors faces a first directional area and a second of the two or more sectors faces a second directional area that is different than the first directional area. The method further comprises operating the at least one of the two or more sectors in the first time period.

In another exemplary embodiment of the present technology, a method for improving functionality of a small cell is provided. The method comprises receiving an indication that a small cell having two or more sectors is to be tested to determine which of the two or more sectors are to operate in a current time period, and listening directionally to ascertain a current network performance, the current network performance including readings from a relay backhaul from the small cell to a macro cell. The method further comprises determining, based on the current network performance, that at least one of the two or more sectors is to operate in the current time period, and operating the at least one of the two or more sectors in the current time period.

In another exemplary embodiment of the present technology, a system for improving functionality of a small cell is provided. The system comprises a processor and one or more computer-readable media storing computer-useable instructions thereon that, when used by the processor, allow the processor to determine to perform a first test on the small cell to determine if at least one of two or more sectors of the small cell is to operate during a first time period, acquire a plurality of information from the first test, the plurality of information comprising a quantity of users present in each directional area corresponding to each sector of the two or more sectors, perform the first test, the first test comprising listening directionally to ascertain a current network performance, and based on the current network performance, identify the at least one of the two or more sectors.

BRIEF DESCRIPTION OF THE DRAWINGS

The present technology is described in detail herein with reference to the drawing figures, which are intended to be exemplary and non-limiting in nature, wherein.

DETAILED DESCRIPTION

The subject matter of select embodiments of the present technology is described with specificity herein to meet statutory requirements. However, the description itself is not intended to define the scope of the invention. Rather, the claimed subject matter might be embodied in other ways to include different elements, steps, and/or combinations of elements/steps similar to the ones described in this disclosure, and in conjunction with other present or future technologies. Terms should not be interpreted as implying any particular order among or between various steps or blocks disclosed herein unless and except when the order of individual steps or blocks is explicitly described and required.

Throughout this disclosure, several acronyms and shorthand notations are used to aid in the understanding of certain concepts. These acronyms and shorthand notations are intended to help provide an easy methodology of communicating the ideas expressed herein, and are not meant to limit the scope of the present disclosure and technology. The following is a list of the acronyms:

| | |
|---|---|
| AMBR | Aggregate Maximum Bit Rate |
| APN | Access Point Name |
| BS | Base Station |
| CDMA | Code Division Multiple Access |
| DNS | Domain Name System |
| eNodeB | Evolved Node B |
| GPRS | General Packet Radio Service |
| GSM | Global System for Mobile Communications |
| IP | Internet Protocol |
| IPv4 | Internet Protocol Version 4 |
| IPv6 | Internet Protocol Version 6 |
| LTE | Long Term Evolution |
| PDN | Packet Data Network |
| PGW | PDN Gateway |
| QoS | Quality of Service |
| WCDMA | Wideband Code Division Multiple Access |

Further, various technical terms are used throughout this description. An illustrative resource that describes these terms may be found in Newton's Telecom Dictionary, 27th Edition (2012). Additionally, as used in this disclosure, "macro cell" refers to a cell in a wireless communication network that provides coverage served by a base station (e.g., a tower), and a "small cell" refers to a cell that can be linked to a macro cell through a relay backhaul (e.g., a network connection with the macro cell). A "mobile device," as used herein, is a device that has the capability of using a wireless communications network. A mobile device may take on a variety of forms, such as a personal computer (PC), a laptop computer, a tablet, a mobile phone, a personal digital assistant (PDA), a server, or any other device that is capable of communicating with other devices using a wireless communications network. Additionally, embodiments of the present technology may be used with different technologies or standards, including, but not limited to, CDMA 1XA, GPRS, EvDO, TDMA, GSM, WiMax technology, LTE, and/or LTE Advanced, among other technologies and standards.

Embodiments of the technology may be embodied as, among other things, a method, a system, and/or a computer-program product. Accordingly, the embodiments may take the form of a hardware embodiment, or an embodiment combining software and hardware. In one embodiment, the technology may take the form of a computer-program product that includes computer-useable instructions embodied on one or more computer-readable media.

Computer-readable media may include both volatile media, non-volatile media, removable media, non-removable media, and contemplate media readable by a database, a switch, and/or various other network devices. Network switches, routers, and related components are conventional in nature, as are methods of communicating with the same.

By way of example, and not limitation, computer-readable media may include computer storage media and/or communications media.

Computer storage media, or machine-readable media, may include media implemented in any method or technology for storing information. Examples of stored information include computer-useable instructions, data structures, program modules, and other data representations. Computer storage media may include, but are not limited to, RAM, ROM, EEPROM, flash memory or other memory technology, CD-ROM, digital versatile discs (DVD), holographic media or other optical disc storage, magnetic cassettes, magnetic tape, magnetic disk storage, and other storage devices. These memory components may store data momentarily, temporarily, and/or permanently.

Communications media typically store computer-useable instructions—including data structures and program modules—in a modulated data signal. The term "modulated data signal" refers to a propagated signal that has one or more of its characteristics set or changed to encode information in the signal. Communications media includes any information-delivery media. By way of example, but not limitation, communications media may include wired media, such as a wired network or direct-wired connection, and wireless media such as acoustic, infrared, radio, microwave, spread-spectrum, and other wireless media technologies. Combinations of the above are included within the scope of computer-readable media. Communications media do not include signals per se.

The present technology relates generally to small cell placement, configuration, and operation. In one exemplary embodiment, a wireless communication network may include a macro cell, a small cell, and one or more mobile devices. The small cell may be positioned at a selected location to provide a relay backhaul to the macro cell for increased communication ability between mobile devices in proximity to the small cell. The small cell may be connected, coupled, and/or interlinked with a device (e.g., a fan, a sign, an electronic display, a speaker, and/or some other electronic or mechanical device), the functionality and/or characteristics of which are affected by the position of the small cell, such that when it is determined that the small cell is not located at a selected location, feedback and/or instruction may be provided in one or more forms to facilitate repositioning of the small cell at the selected location. Additionally, in another exemplary embodiment, directional listening may be used to determine whether a small cell is able to detect and connect to a macro cell from its current location. The small cell may further be configured to determine, based on the listening, which of its sectors of coverage should operate in an existing network environment and/or time period (e.g., based on a number of mobile devices in each sector, ambient noise, interference, orientation of an associated macro cell, network performance, etc.).

Figure 1:
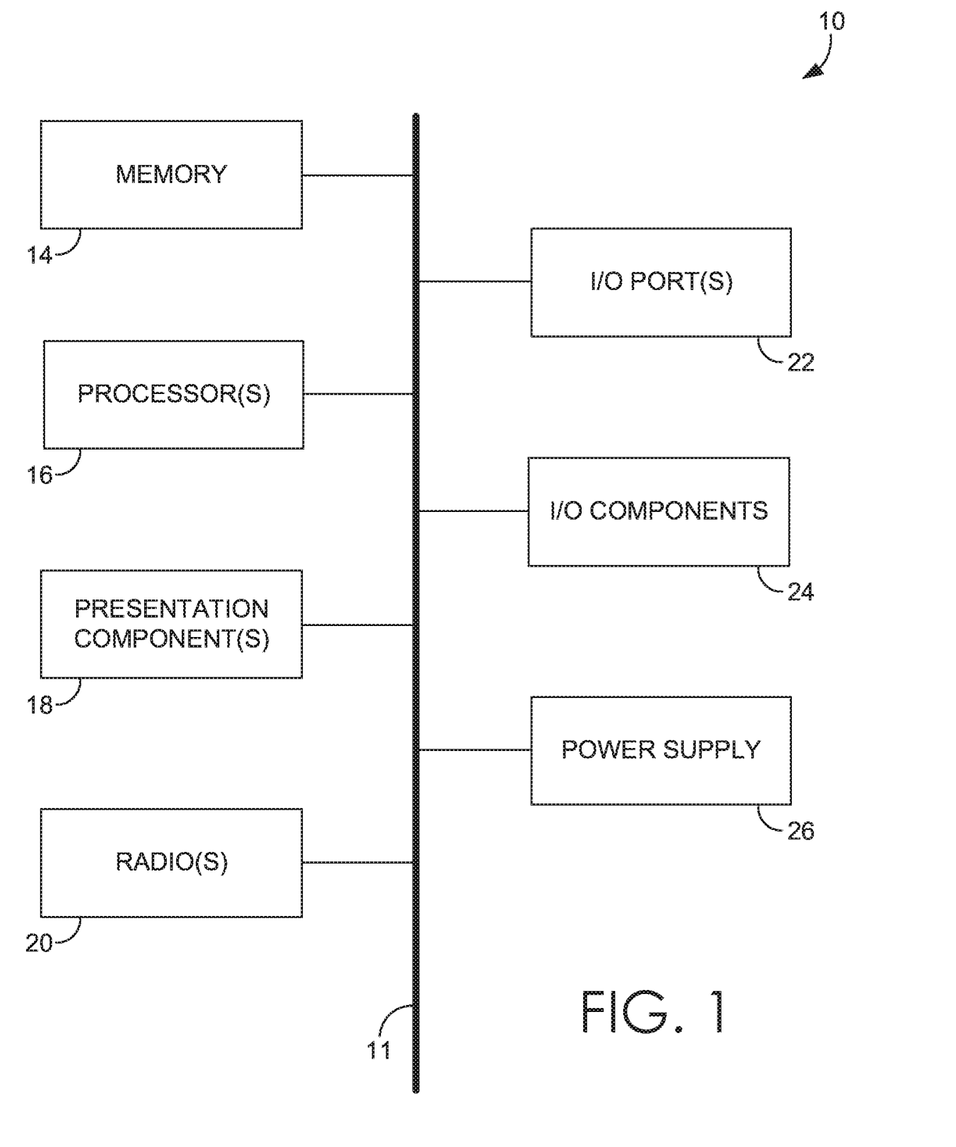
FIG. 1 depicts an exemplary computing environment suitable for practicing an embodiment of the present technology.

Referring to the drawings in general, and initially to FIG. 1, an exemplary computing environment 10 suitable for practicing embodiments of the present technology is provided. Computing environment 10 is but one example, and is not intended to suggest any limitation as to the scope of use or functionality of the embodiments discussed herein. Neither should the computing environment 10 be interpreted as having any dependency or requirement relating to any one or a combination of components illustrated. It should be noted that although some components in FIG. 1 are shown in the singular, they may be plural. For example, the computing environment 10 might include multiple processors and/or multiple radios. As shown in FIG. 1, computing environment 10 includes a bus 11 that directly or indirectly couples various components together, including memory 14, processor(s) 16, presentation component(s) 18 (if applicable), radio(s) 20, input/output (I/O) port(s) 22, input/output (I/O) component(s) 24, and power supply 26. More or fewer components are possible and contemplated, including in consolidated or distributed form.

Memory 14 may take the form of memory components described herein. Thus, further elaboration will not be provided here, but it should be noted that memory 14 may include any type of tangible medium that is capable of storing information, such as a database. A database may be any collection of records, data, and/or information. In one embodiment, memory 14 may include a set of embodied computer-executable instructions that, when executed, facilitate various functions or elements disclosed herein. These embodied instructions will variously be referred to as "instructions" or an "application" for short. Processor 16 may actually be multiple processors that receive instructions and process them accordingly. Presentation component 18 may include a display, a speaker, and/or other components that may present information (e.g., a display, a screen, a lamp (LED), a graphical user interface (GUI), and/or even lighted keyboards) through visual, auditory, and/or other tactile cues.

Radio 20 may facilitate communication with a network, and may additionally or alternatively facilitate other types of wireless communications, such as Wi-Fi, WiMAX, LTE, and/or other VoIP communications. In various embodiments, the radio 20 may be configured to support multiple technologies, and/or multiple radios may be configured and utilized to support multiple technologies.

The input/output (I/O) ports 22 may take a variety of forms. Exemplary I/O ports may include a USB jack, a stereo jack, an infrared port, a firewire port, other proprietary communications ports, and the like. Input/output (I/O) components 24 may comprise keyboards, microphones, speakers, touchscreens, and/or any other item usable to directly or indirectly input data into the computing environment 10.

Power supply 26 may include batteries, fuel cells, and/or any other component that may act as a power source to supply power to the computing environment 10 or to other network components, including through one or more electrical connections or couplings. Power supply 26 may be configured to selectively supply power to different components independently and/or concurrently.

Exemplary Network Environment for Small Cell Use

Figure 2:
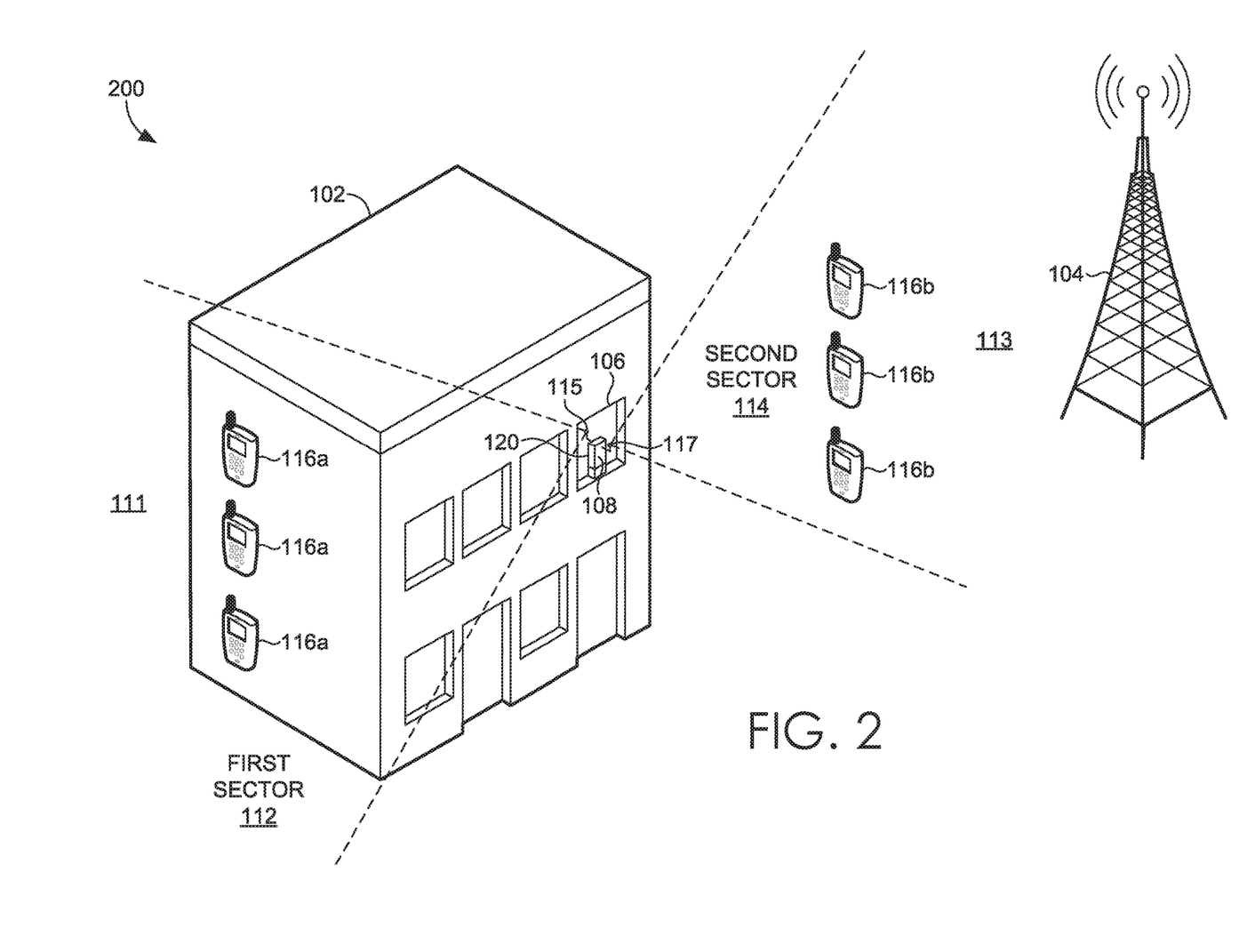
FIG. 2 depicts an exemplary wireless network environment that includes a small cell, a macro cell, and multiple mobile devices, in accordance with an embodiment of the present technology.

Turning to FIG. 2, an exemplary wireless network environment 200 is provided, in accordance with an embodiment of the present technology. The environment 200 includes a macro cell 104, a small cell 108, and a plurality of mobile devices 116a, 116b. FIG. 2 further depicts a structure 102 (e.g., a building) around and/or within which the plurality of mobile devices 116a, 116b are located. In certain circumstances, when the small cell 108 is not used, the mobile devices 116a, 116b may attempt to connect to the macro cell 104, or to one or more other macro cells, to establish connection with the wireless network. However, sometimes, network factors (e.g., a physical line of sight obstruction, signal interference, distance, ambient noise, etc.) may affect uplink/downlink, connectivity, data transfer, and/or attachment of the mobile devices 116a, 116b with the wireless network. Thus, use of the small cell 108 may improve network performance, as described further below.

In FIG. 2, the small cell 108 is positioned and used to provide a relay backhaul to the macro cell 104. The relay backhaul provides a connection between the mobile devices 116*a*, 116*b* and the wireless network by allowing the mobile devices 116*a*, 116*b* to communicate with the macro cell 104 through the small cell 108. The small cell 108 may be configured to provide multiple sectors of coverage oriented in overlapping or distinct directional areas. As shown in FIG. 2, first and second sectors 112, 114 are provided by the small cell 108 that serve respective first and second directional areas 111, 113. The small cell 108 further includes first and second antennas 115, 117 that serve the respective first and second sectors 112, 114.

In order for the small cell 108 to provide a relay backhaul to the macro cell 104 having a desired throughput, the small cell 108 is positioned at a selected location 120 that is chosen based on one or more network factors and/or performance characteristics (e.g., line of sight, signal strength, etc.). In FIG. 2, the selected location 120 is on or proximate to a window 106 of the structure 102. Positioning the small cell 108 in the window 106 of the structure 102 may provide a relay backhaul to the macro cell 104 that is of a higher quality than when the small cell 108 is positioned within the structure 102.

Additionally, the first and second sectors 112, 114 of the small cell 108, and the first and second antennas 115, 117 transmitting/receiving respective radio frequency (RF) signals over the same, may be oriented such that the first sector 112 is oriented at least partially towards the structure 102, and the second sector 114 is oriented at least partially away from the structure 102. As a result, the first sector 112 may provide enhanced communication with mobile devices 116*a* operating within the structure 102, and the second sector may provide enhanced communication with mobile devices 116*b* operating outside of the structure 102, as well an improved relay backhaul with the macro cell 104. It should be noted that one or multiple small cells, each having two or more sectors of coverage oriented in various directions, may be used in the wireless communications network. Additionally, one or more macro cells may be used to establish a relay backhaul for each small cell. Furthermore, in addition to the arrangement shown in FIG. 2, the small cell 108 may be located at other locations, such as an exterior of the structure 102, a roof of the structure 102, and/or any other locations where establishing a relay backhaul is possible. The relay backhaul may be provided through a Long Term Evolution (LTE) connection with the macro cell 104.

It should further be noted that the wireless communications network in which the small cell 108 is operating may include an array of devices or components, some of which are not shown so as not to obscure other relevant aspects of the technology. Components that may be part of the network may include one or more gateways, IPv4 DNS servers, IPv6 DNS servers, and/or translating components. Components such as terminals, links, and nodes (as well as other components) may provide connectivity in some embodiments. The network may include multiple networks, and also may be a network of networks. The network may be part of a telecommunications network that connects subscribers or users to their immediate service provider. In embodiments, the network may be associated with a telecommunications provider that provides services to mobile devices, such as the mobile devices 116*a*, 116*b*. For example, the network may provide voice and/or data services to mobile devices or corresponding users that are registered to utilize the services provided by a telecommunications provider. The network may be any communications network providing voice and/or data service(s), such as, for example, a 1× circuit voice, a 3G network (e.g., CDMA, CDMA2000, WCDMA, GSM, UMTS), or a 4G network (WiMAX, LTE, HSDPA).

Maintaining Small Cell Placement

Positioning of a small cell, such as the small cell 108 shown in FIG. 2, in a wireless communication network may affect the performance of the small cell (e.g., the relay backhaul), and thus, maintaining a desired/selected location of the small cell may be preferable. Accordingly, embodiments of the present technology provide for an apparatus or system by which the small cell 108 can be linked with another device, physically and/or communicatively, to provide feedback on the location of the small cell 108. This feedback may allow a user to directly or indirectly be notified that the small cell 108 is no longer at a desired/selected location, and/or is no longer within a desired distance of the desired/selected location (e.g., no longer within 10 feet), in order to notify the user that the small cell should be repositioned. The feedback may be a communication, or may be a changed or reduced performance of the device linked with the small cell, among other types of feedback. The feedback may further include instructions for repositioning the small cell at the desired/selected location.

Returning to FIG. 2, an apparatus for facilitating placement of the small cell 108 at the selected location 120 may comprise the small cell 108 and a device that is communicatively and/or physically coupled to the small cell 108 for providing feedback. The feedback, which may include an indication, notification, and/or instructions, may be provided when the small cell 108 is not positioned at the selected location 120. The device may be a fan, a speaker, an electronic display, an open/closed sign, a mobile device, a radio, a computer, a Bluetooth device, or another electronic or mechanical device, and may also comprise one or multiple devices, separate or interconnected.

Instructions for repositioning the small cell 108 may include an audible message, a text message, an email, and/or other visual, auditory, and/or tactile cues that indicate to reposition the small cell 108 at the selected location 120. For example, the device may comprise a mobile device, and a notification, such as a text message, may be sent to the mobile device with instructions to reposition the small cell 108 at the selected location 120. Alternatively, the feedback may be provided through changed operation of the device (e.g., reduced or altered operation of a fan, heater/air conditioner, speaker, display, mobile device, wireless internet, etc.). The feedback may be triggered and/or communicated based on a distance of the small cell 108 from the selected location 120, a signal connection between the small cell 108 and the macro cell 104 dropping below a threshold amount, and/or one or more sensors indicating that a location of the small cell 108 has changed or exceeded a predetermined distance from the selected location 120, among other indicators and determinations. The above-listed examples are intended to be exemplary and non-limiting, and other types of feedback are possible and contemplated herein.

Small Cell Testing, Configuration, and Optimization

In embodiments of the present technology, a small cell, such as the small cell 108 shown in FIG. 2, may further be configured to be tested, controlled, and/or tailored to unique environmental requirements through directional testing and listening of the associated sectors of coverage. For example, referring to FIG. 2, the small cell 108 may perform directional listening with its first and second sectors 112, 114 to determine if it can detect and/or attach to the macro cell 104 with at least one of the first and second sectors 112, 114 based on one or more network factors such as a connectivity, signal strength, throughput, a reference-signal-receivedpower (RSRP), a signal-to-noise ratio (SNR), and a signal-to-interference-plus-noise ratio (SINR), among other possible factors.

Additionally, use of the small cell 108 may be tailored to the surrounding environment by performing directional listening with the first and second sectors 112, 114 and the first and second antennas thereof 115, 117. For example, directional listening may allow the small cell 108 to determine (1) if any of the mobile devices 116a, 116b are within range and/or can be served by the small cell 108, (2) a signal strength of any of the mobile devices 116a, 116b in range of the small cell 108, (3) an amount of signal power and/or sector coverage needed from the small cell 108, and/or (4) any other performance or coverage determinations.

Based on the listening performed at the small cell 108, one or both of the first and second sectors 112, 114 may be selected to operate as needed. The selection of operating sectors may be based on a predetermined number of mobile devices 116a, 116b being within range, a minimum signal threshold with one or more of the mobile devices 116a, 116b, and/or a signal strength or established connection with the macro cell 104. As a result, the small cell 108 can utilize only those sectors of coverage that are needed, limiting use of unnecessary network resources. Sector testing may also allow the small cell 108 to deactivate sectors of coverage when mobile device traffic is below a threshold amount for those sectors of coverage, or when signal interference reduces network performance rather than improves it. During operation, a relay backhaul through the small cell 108 may be monitored over a selected period of time to provide network performance data which can further be used for determining sector operation. Additionally, testing of various sectors of coverage, mobile device density, and orientation and communication with nearby macro cells may be performed continually, on demand, or at regular intervals, to provide optimal use of network resources over time.

Figure 3:
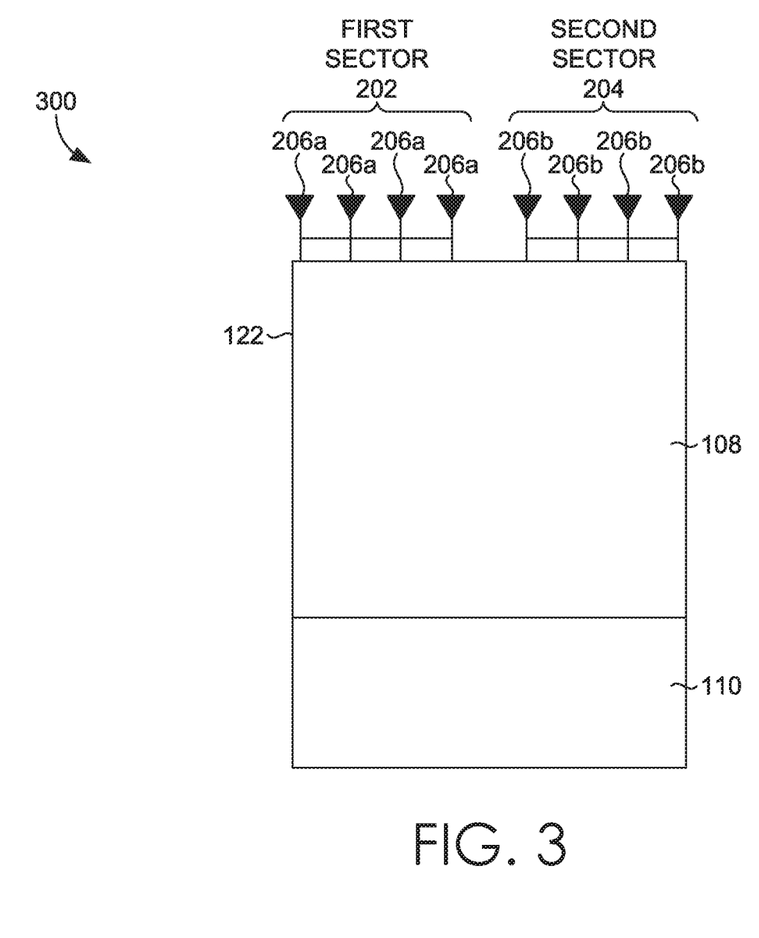
FIG. 3 depicts an exemplary small cell configured to provide multiple sectors of coverage in a network, in accordance with an embodiment of the present technology.

Referring to FIG. 3, an exemplary small cell 300 for use in a wireless communications network is provided, in accordance with an embodiment of the present technology. The small cell 300 provides first and second sectors of coverage 202, 204 served by respective first and second pluralities of antennas 206a, 206b. The small cell 300 is able to communicate with mobile devices, such as mobile devices 116a, 116b shown in FIG. 2, as well as with macro cells, such as the macro cell 104 shown in FIG. 2. The small cell 300 further includes a power supply 110 and a housing 122 to which the antennas 206a, 206b may be coupled. Although two sectors of coverage 202, 204 are shown with the small cell 300 in FIG. 3, it should be understood that any number of small cells and associated sectors and antennas may be used to communicate with the network and devices therein.

One or more mobile devices, such as the mobile devices 116a, 116b shown in FIG. 2, may connect to the wireless communications network through the small cell 300 which provides communication with a macro cell, such as the macro cell 104 shown in FIG. 2. The mobile devices may communicate with the macro cell via a wireless telecommunications link to facilitate attachment of the mobile devices to the macro cell. Once attached, the mobile devices may also use the wireless telecommunications link to send and/or receive voice call information, data information, and/or information concerning device capabilities. In one aspect, the mobile devices may utilize the wireless telecommunications link to send requests for content from a web-based service, such as, for example, a website.

Figure 4:
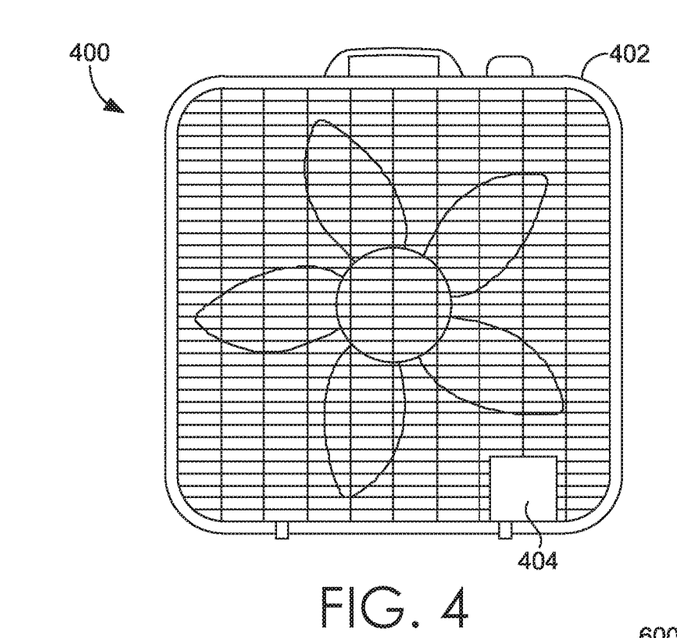
FIG. 4 depicts an exemplary apparatus for improving functionality of a small cell in a network, in accordance with an embodiment of the present technology.

Referring to FIG. 4, an apparatus 400 for improving functionality of a small cell, such as the small cell 108 shown in FIG. 2, is provided, in accordance with an embodiment of the present technology. In FIG. 4, the apparatus 400 comprises a first device 404 comprising a small cell and a second device 402 comprising a fan. As described herein, the first device and the second device may be communicatively and/or physically coupled, such that when the apparatus 400 is positioned at a selected location (e.g., in a window of a building), or within a predetermined distance of a selected location, the second device, and more specifically the fan, may operate at a desired capacity or functionality. Additionally, when the apparatus 400 is positioned at the selected location, a relay backhaul may be established between the small cell and a macro cell, allowing mobile devices in proximity to the small cell to communicate with the wireless network through the small cell.

When the apparatus 400 is moved from the selected location, such as, for example, due to a user repositioning the fan, the second device 402, and more specifically the fan, may change operation to indicate to a user that the apparatus 400 is not positioned at the selected location or within a desired distance of the selected location. For example, when the apparatus 400 is moved, the fan may provide reduced operation or stop altogether. As the apparatus 400 is relocated to the selected location or to within a predetermined distance of the selected location, the fan may restore partial or full operation, indicating that the apparatus 400 is correctly positioned. As such, a user will be inclined to keep the apparatus 400 at the selected location, which provides the desired relay backhaul. Although a fan is provided in FIG. 4, alternative devices may be used, such as a heater/air conditioner, a clock, a decorative item, or another mechanical or electrical device. The small cell may be the small cell 108 described with respect to FIG. 2. The small cell may also include one or more transmitting and receiving components (e.g., antennas) for providing feedback to a user's mobile device regarding the position and/or operation of the apparatus 400.

Figure 5:
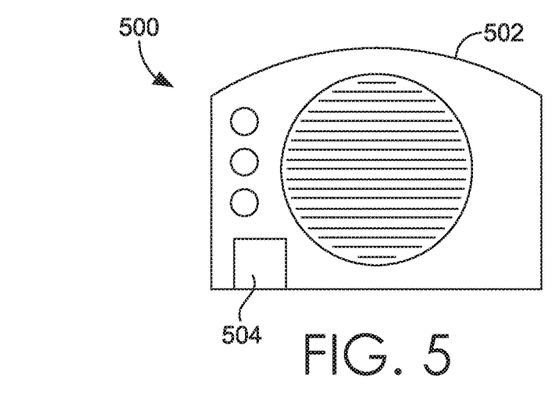
FIG. 5 depicts another exemplary apparatus for improving functionality of a small cell in a network, in accordance with an embodiment of the present technology.

Referring to FIG. 5, another apparatus 500 for improving functionality of a small cell is provided, in accordance with an embodiment of the present technology. The apparatus 500 comprises a first device 504 comprising a small cell and a second device 502 comprising a speaker (e.g., a Bluetooth speaker). As with the apparatus 400 of FIG. 4, the small cell and the speaker may be physically and/or communicatively coupled, such that when the small cell is moved from a selected location, such as the selected location 120 shown in FIG. 2, or exceeds a predetermined distance from the selected location, the operation of the speaker may change. For example, an audible output of the speaker may be reduced or stopped, an audible message may be emitted (e.g., "reposition speaker"), and/or a message may be sent from a Bluetooth device associated with the speaker to another device. The message may provide feedback about the position of the apparatus 500, and/or any instructions for repositioning the apparatus 500. Additional electronic devices, such as screens, displays, computers, and/or other electronic display and communication devices may be utilized to provide similar functionality.

Figure 6:
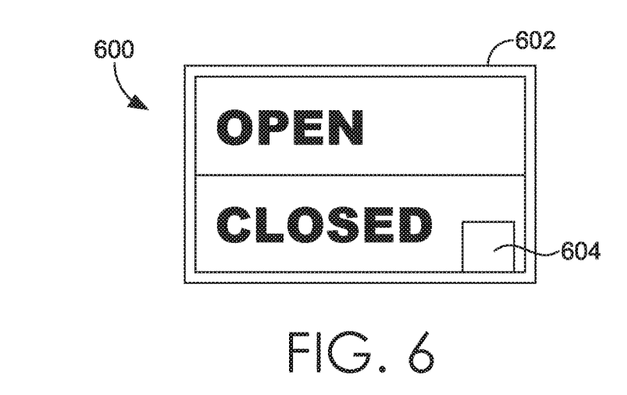
FIG. 6 depicts another exemplary apparatus for improving functionality of a small cell in a network, in accordance with an embodiment of the present technology.

Referring to FIG. 6, another apparatus 600 for improving functionality of a small cell is provided, in accordance with an embodiment of the present technology. In FIG. 6, the apparatus 600 comprises a first device 604 comprising a small cell and a second device 602 comprising an open/closed sign. In operation, the small cell may be positioned at a selected location, such as the selected location 120 shown in FIG. 2. When the small cell is moved from the selected location, or is moved a predetermined distance from the selected location, the operation of the second device, and more specifically the open/closed sign, may change, such as by the open/closed sign de-illuminating, providing reduced illumination, providing a different display, or some other change in function that is visible or audible to a user so that the user knows to reposition the apparatus 600. Additionally, the small cell may be in communication with a mobile device to provide feedback directly to the mobile device. Further, in any of the exemplary apparatuses 400, 500, 600 described herein, or in any other alternative apparatuses, one or more sensors may be utilized to provide location information for the purposes of determining whether such apparatuses 400, 500, 600 are positioned at or within a desired distance of the selected location. The sensors may provide location information about the small cell, and may be located within, or may be coupled to, the associated apparatus or small cell thereof.

Figure 7:
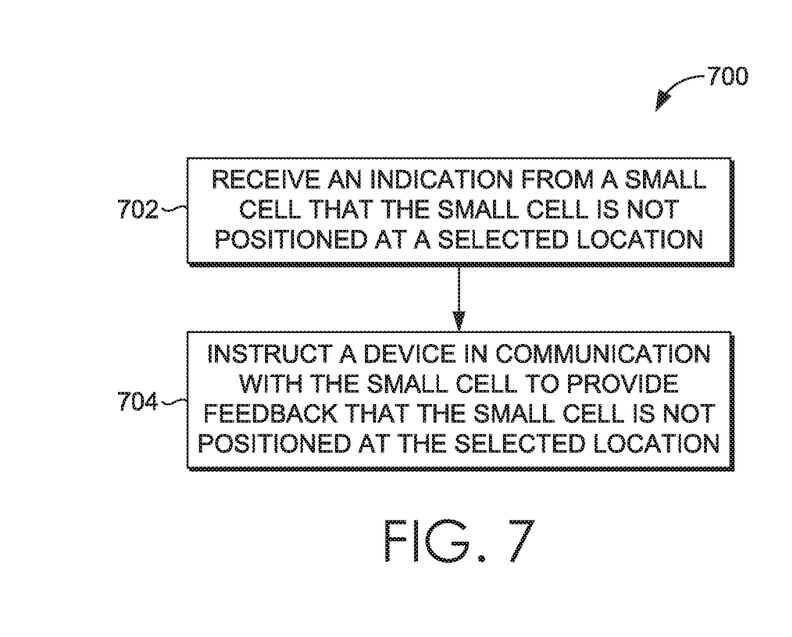
FIG. 7 depicts a block diagram of an exemplary method of facilitating a desired placement of a small cell in a network, in accordance with an embodiment of the present technology.

Referring to FIG. 7, a block diagram of an exemplary method 700 of facilitating a desired placement of a small cell is provided, in accordance with an embodiment of the present technology. At a block 702, an instruction is received at a small cell, such as the small cell 108 shown in FIG. 2, that the small cell is not positioned at a selected location, such as the selected location 120 shown in FIG. 2. At a block 704, a device, such as the second device 404 comprising a fan shown in FIG. 4, in communication with the small cell is instructed to provide feedback that the small cell is not positioned at the selected location.

Figure 8:
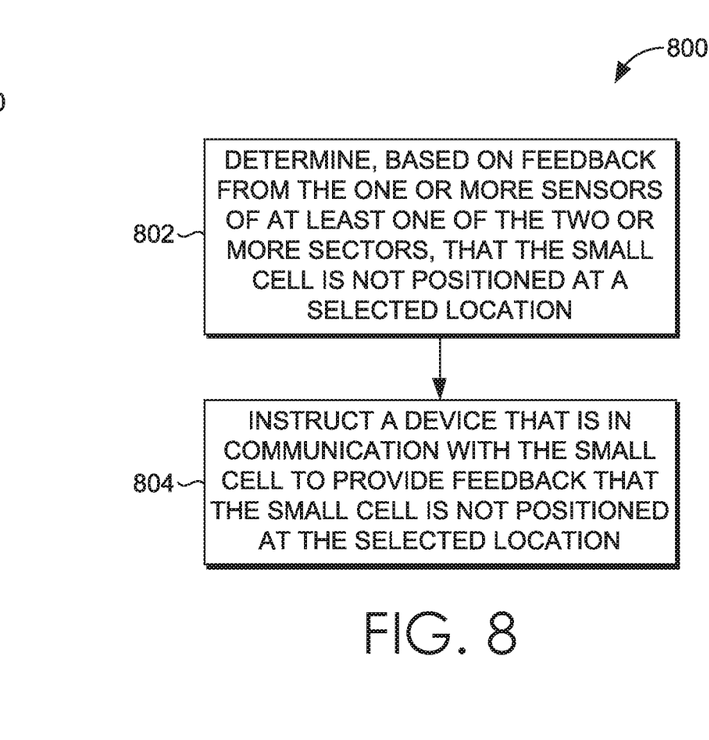
FIG. 8 depicts a block diagram of another exemplary method of facilitating a desired placement of a small cell in a network, in accordance with an embodiment of the present technology.

Referring to FIG. 8, a block diagram of a method 800 for facilitating placement of a small cell is provided, in accordance with an embodiment of the present technology. At a block 802, it is determined, based on feedback from one or more sensors, such as a Global Positioning System (GPS) sensor or other location-based sensor(s) coupled to the small cell, of at least one of one or more sectors, such as the first and second sectors 112, 114 shown in FIG. 2, of a small cell, such as the small cell 108 shown in FIG. 2, that the small cell is not positioned at a selected location, such as the selected location 120 shown in FIG. 2. At a block 804, a device, such as the second device 402 shown in FIG. 4, that is in communication with the small cell is instructed to provide feedback, such as reduced or altered operation of the second device or communication to a mobile device, that the small cell is not positioned at the selected location.

Figure 9:
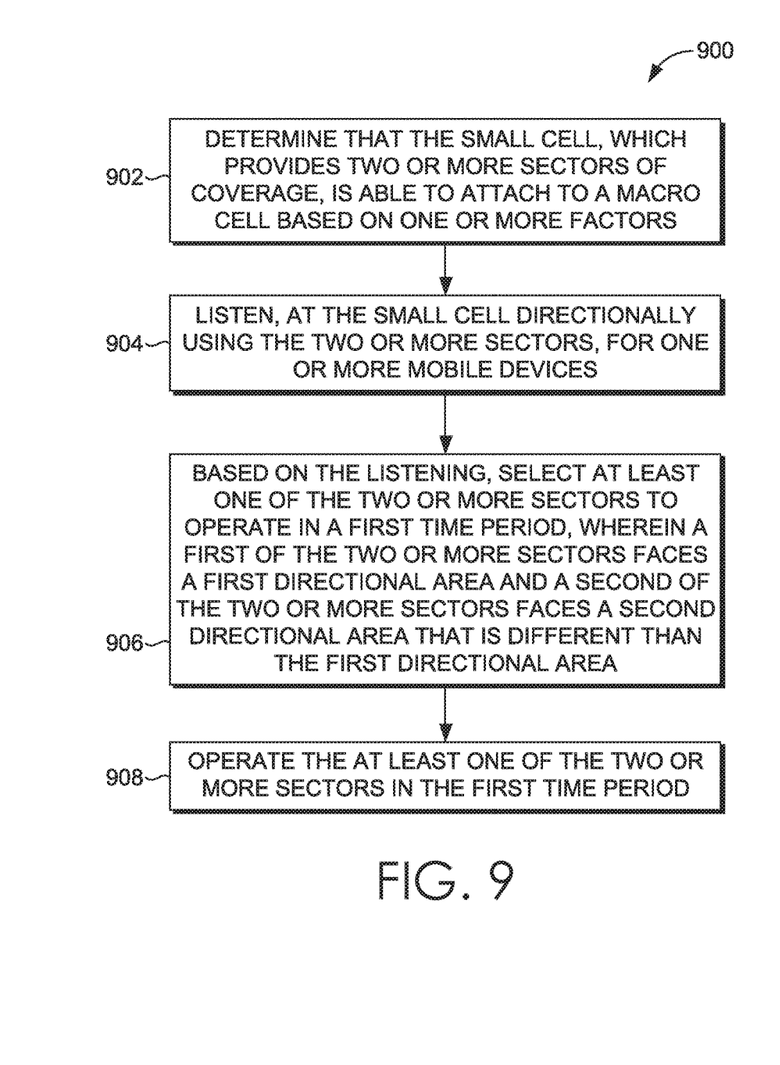
FIG. 9 depicts a block diagram of an exemplary method of improving functionality of a small cell in a network, in accordance with an embodiment of the present technology.

Referring to FIG. 9, a block diagram of a method 900 of improving functionality of a small cell is provided, in accordance with an embodiment of the present technology. At a block 902, it is determined that the small cell, such as the small cell 108 shown in FIG. 2, which provides two or more sectors of coverage, such as the first and second sectors 112, 114 shown in FIG. 2, is able to attach to a macro cell, such as the macro cell 104 shown in FIG. 2, based on one or more factors, such as throughput, signal level, reference-signal-received-power (RSRP), signal-to-noise ratio (SNR), and signal-to-interference-plus-noise ratio (SINR). At a block 904, directional listening for one or more mobile devices, such as the mobile devices 116a, 116b shown in FIG. 2, occurs using the two or more sectors. At a block 906, based on the listening, at least one of the two or more sectors is selected to operate in a first time period. A first of the two or more sectors may face a first directional area, such as the first directional area 111 shown in FIG. 2, and a second of the two or more sectors may face a second directional area, such as the second directional area 113 shown in FIG. 2, that is different than the first directional area. At a block 908, at least one of the two or more sectors is operated in the first time period.

Figure 10:
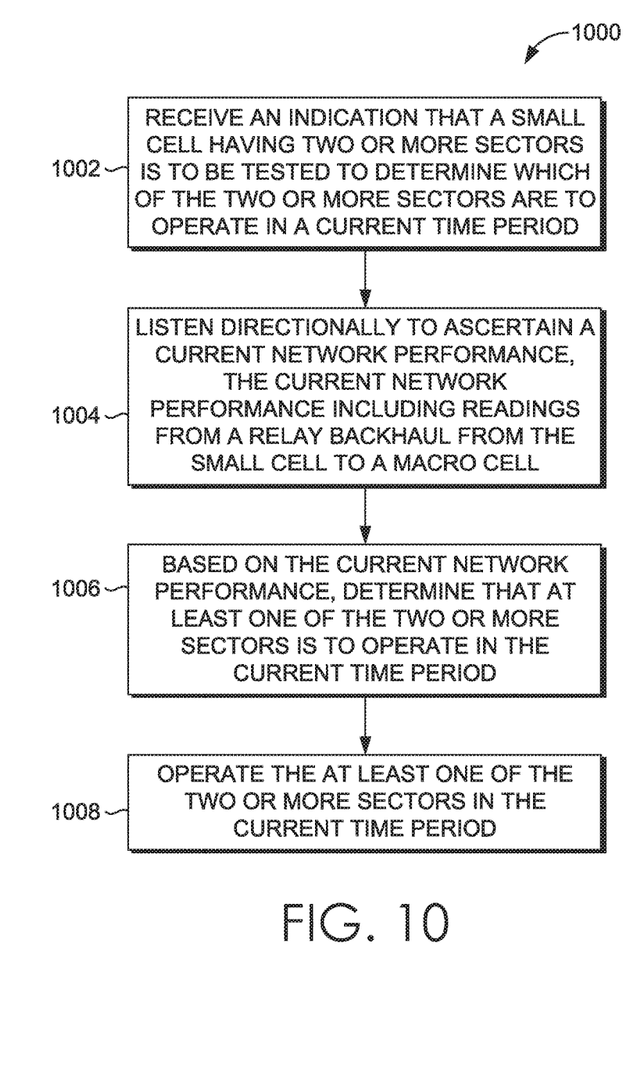
FIG. 10 depicts a block diagram of another exemplary method of improving functionality of a small cell in a network, in accordance with an embodiment of the present technology.

Referring to FIG. 10, a block diagram of a method 1000 of improving functionality of a small cell is provided, in accordance with an embodiment of the present technology. At a block 1002, an indication is received that a small cell, such as the small cell 108 shown in FIG. 2, having two or more sectors, such as the first and second sectors 112, 114, is to be tested to determine which of the two or more sectors are to operate in a current time period. At a block 1004, directional listening is performed to ascertain a current network performance. The current network performance may include readings from a relay backhaul from the small cell to a macro cell, such as the macro cell 104 shown in FIG. 2, and/or factors such as throughput, signal level, reference-signal-received-power (RSRP), signal-to-noise ratio (SNR), and signal-to-interference-plus-noise ratio (SINR). At a block 1006, it is determined, based on the current network performance, that at least one of the two sectors is to operate in the current time period. At a block 1008, at least one of the two or more sectors is operated in the current time period.

Figure 11:
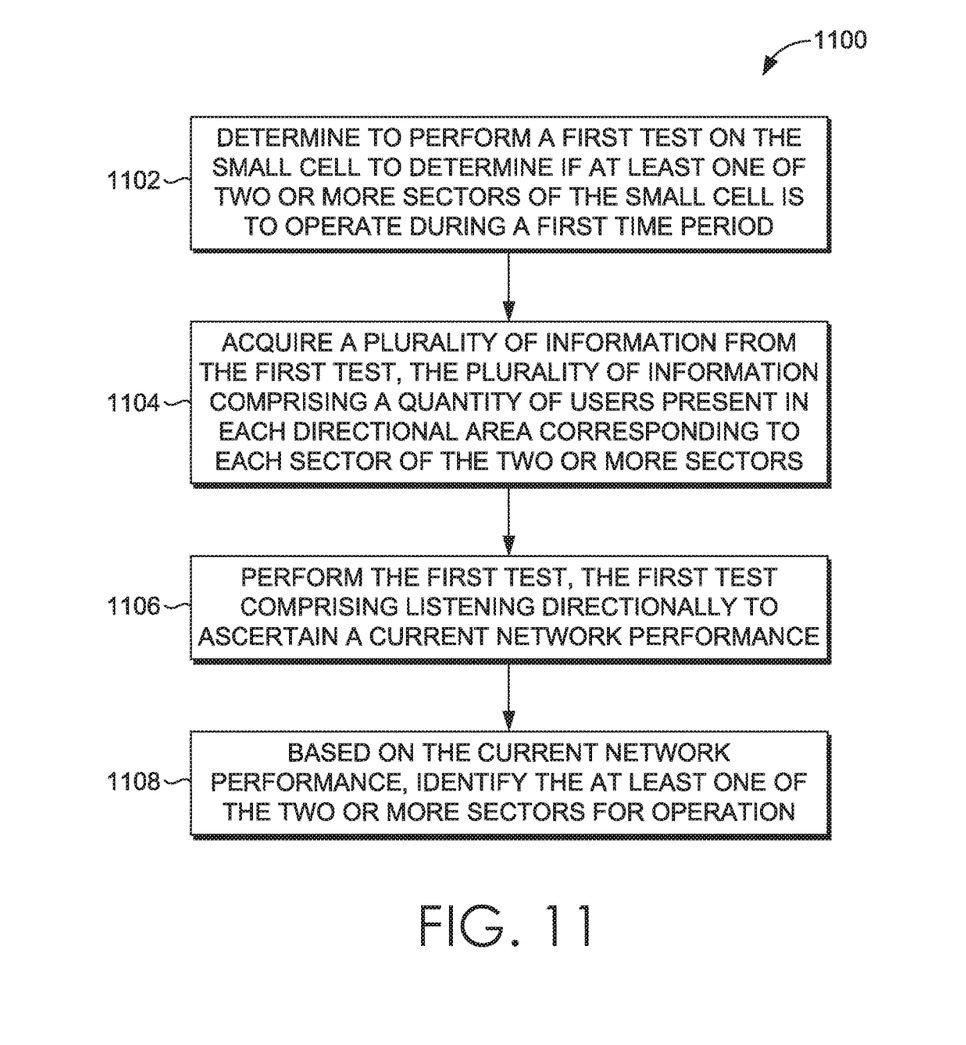
FIG. 11 depicts a block diagram of another exemplary method of improving functionality of a small cell in a network, in accordance with an embodiment of the present technology.

Referring to FIG. 11, a block diagram of a method 1100 of improving functionality of a small cell is provided, in accordance with an embodiment of the present technology. At a block 1102, it is determined to perform a first test on a small cell, such as the small cell 108 shown in FIG. 2, to determine if at least one of two or more sectors, such as the first and second sectors 112, 114 shown in FIG. 2, is to operate during a first time period. At a block 1104, a plurality of information is acquired from the first test, the plurality of information comprising a quantity of users, such as a quantity of the mobile devices 116a, 116b shown in FIG. 2, present in each directional area, such as the first and second directional areas 111, 113 shown in FIG. 2, corresponding to each sector of the two or more sectors. At a block 1106, the first test is performed, the first test comprising listening directionally to ascertain a current network performance. At a block 1108, based on the current network performance, at least one of the two or more sectors is identified for operation.

Many different arrangements of the various components depicted, as well as components not shown, are possible without departing from the scope of the claims herein. Embodiments of the technology have been described with the intent to be illustrative rather than restrictive. Alternative embodiments will become apparent to readers of this disclosure after and because of reading it. Alternative methods of implementing the aforementioned subject matter may be performed without departing from the scope of the claims herein. Certain features and sub-combinations are of utility and may be employed without reference to other features and sub-combinations, which is contemplated as within the scope of the claims.

What is claimed is:

1. An apparatus for facilitating a desired placement of a small cell, the apparatus comprising:

a small cell configured to provide at least two sectors of coverage, the small cell having one or more antennas associated with each one of the at least two sectors of coverage, wherein the one or more antennas are configured to transmit and receive radio frequency (RF) signals over a wireless telecommunications network; and a feedback component physically coupled to the small cell, the feedback component being configured to provide a first functionality when the apparatus is at a selected location and a second functionality in response to a determination that a location of the apparatus exceeds a predetermined distance from the selected location, wherein the selected location is a location for positioning the small cell where one or more network parameters of a backhaul connection between the small cell and a macro cell established by the small cell exceeds a threshold, and wherein the selected location is a minimum distance from the macro cell, the first functionality different than the second functionality, wherein the apparatus is further configured to perform a method comprising:

determining, by listening directionally to ascertain a current network performance, which of two or more sectors are to operate in a time period, wherein the current network performance comprises one or more network parameters of a relay backhaul from the small cell to a macro cell, and wherein the two or more sectors comprise an area of coverage provided by the small cell to one or more user devices; and determining, based on the current network performance, that a first sector of the two or more sectors is to operate in the time period.

2. The apparatus of claim 1, wherein the first functionality comprises performing a function and the second functionality comprises not performing the function.

3. The apparatus of claim 1, wherein the first functionality is user-controlled and the second functionality is a preset output indicating that the small cell is not in the selected location.

4. The apparatus of claim 3, wherein the feedback component is communicatively coupled to a user device and the first functionality is provided in response to an instruction from the use device.

5. The apparatus of claim 1, wherein the apparatus is further configured to provide coverage for the one or more user devices in the first sector during the time period.

6. One or more non-transitory computer-readable media having computer executable instructions embodied thereon that, when executed perform a method for facilitating a desired placement of a small cell, the method comprising:

determining that the small cell is not positioned at a selected location based on a location of the small cell exceeding a predetermined distance from the selected location, the small cell configured to provide at least two sectors of coverage, the small cell having one or more antennas associated with each one of the at least two sectors of coverage, wherein the one or more antennas are configured to transmit and receive radio frequency (RF) signals over a wireless telecommunications network;

instructing a feedback component physically coupled to the small cell to provide a second functionality in response to the determination, the second functionality different than a first functionality, wherein the feedback component provides the first functionality when the small cell is positioned within the predetermined distance from the selected location, and wherein the selected location is a minimum distance from a source of a backhaul connection between the small cell and a macro cell;

determining, by listening directionally to ascertain a current network performance, which of two or more sectors are to operate in a time period, wherein the current network performance comprises one or more network parameters of a relay backhaul from the small cell to a macro cell, and wherein the two or more sectors comprise an area of coverage provided by the small cell to one or more user devices; and determining, based on the current network performance, that a first sector of the two or more sectors is to operate in the time period.

7. The one or more non-transitory computer-readable media of claim 6, wherein the first functionality comprises performing a function and the second functionality comprises not performing the function.

8. The one or more non-transitory computer-readable media of claim 6, wherein the second functionality is an indication that the small cell should be repositioned.

9. The one or more non-transitory computer-readable media of claim 6, further comprising sending a message to a device comprising a position of the small cell and instructions for repositioning the small cell.

10. A system for facilitating a desired placement of a small cell, the system comprising:

a small cell configured to provide at least two sectors of coverage, the small cell having one or more antennas associated with each one of the at least two sectors of coverage, wherein the one or more antennas are configured to transmit and receive radio frequency (RF) signals over a wireless telecommunications network, and wherein the small cell has one or more sensors associated with each one of the two or more sectors;

a feedback component physically coupled to the small cell;

a processor; and one or more computer-readable media storing computer-useable instructions thereon, that, when executed by the processor, allow the processor to:

determine, based on feedback from the one or more sensors of at least one of the two or more sectors, that the small cell exceeds a predetermined distance from a predetermined location, instruct the feedback component to provide a second functionality, the second functionality different than a first functionality, wherein the feedback component performs the first functionality when it is determined that the small cell is within the predetermined distance from the predetermined location, and wherein the predetermined location is a minimum distance from a source of a backhaul connection between the small cell and a macro cell;

determine, by listening directionally to ascertain a current network performance, which of two or more sectors are to operate in a time period, wherein the current network performance comprises one or more network parameters of a relay backhaul from the small cell to a macro cell, and wherein the two or more sectors comprise an area of coverage provided by the small cell to one or more user devices; and determine, based on the current network performance, that a first sector of the two or more sectors is to operate in the time period.

11. The system of claim 10, wherein the first functionality comprises performing a function and the second functionality comprises not performing the function.

12. The system of claim 10, wherein the feedback component is capable of being communicatively coupled to a mobile device via a short range wireless protocol, wherein the short range wireless protocol is different than a communication protocol used by the small cell to communicate with the source of the backhaul connection.

13. The system of claim 10, wherein at least one of the first functionality or the second functionality comprises a visually-perceptible indication.

* * * * *